March 30, 1954 J. P. MONTGOMERY 2,673,620
SMOKE FILTERING APPARATUS
Filed Oct. 5, 1951 2 Sheets-Sheet 2
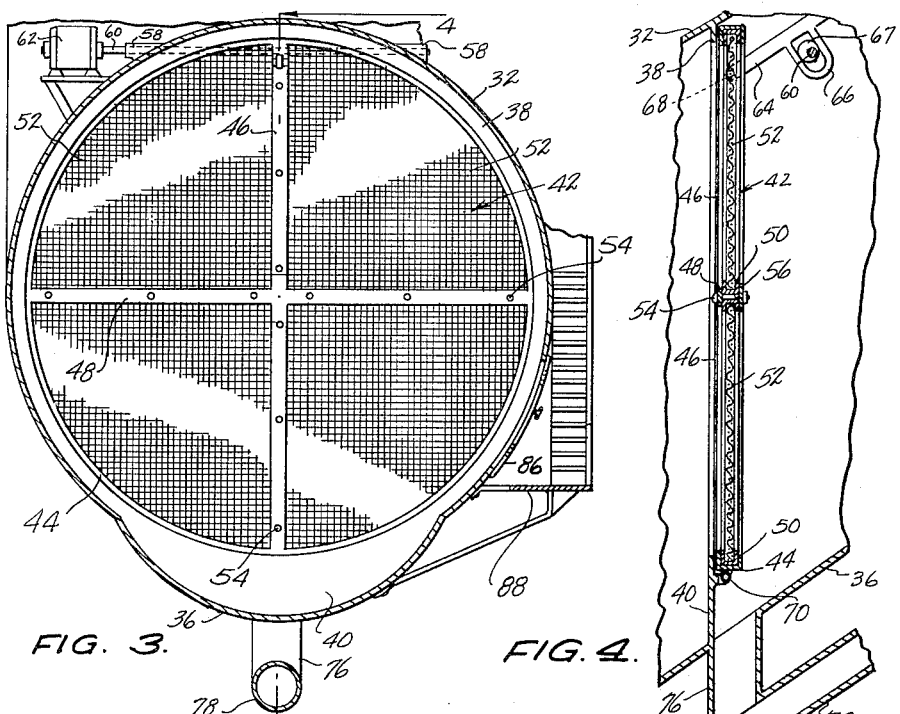
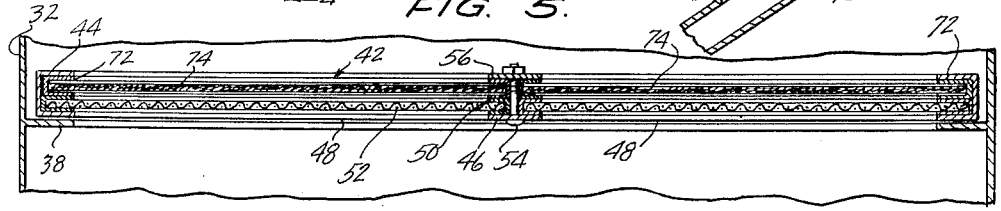
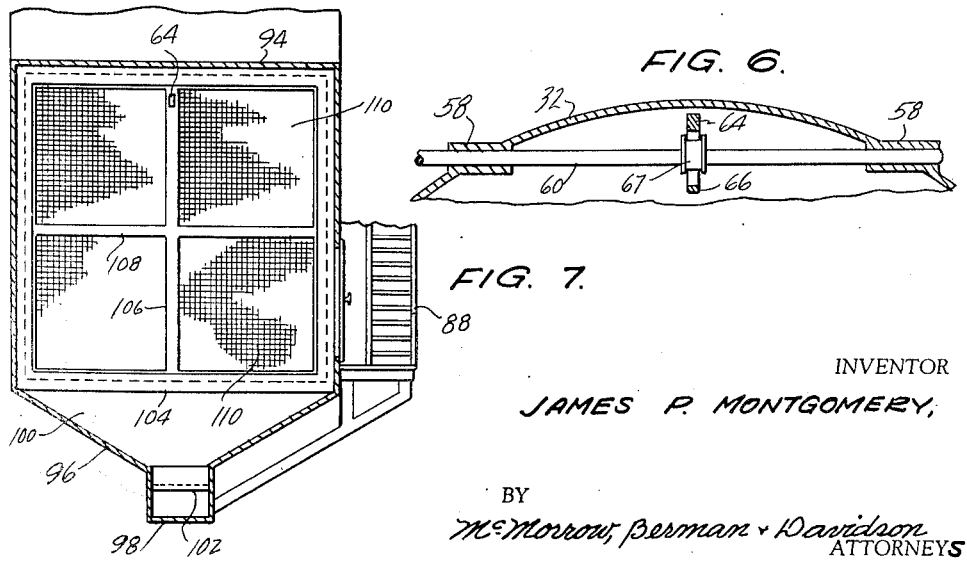
INVENTOR
JAMES P. MONTGOMERY,
BY
McMorrow, Berman + Davidson
ATTORNEYS Patented Mar. 30, 1954

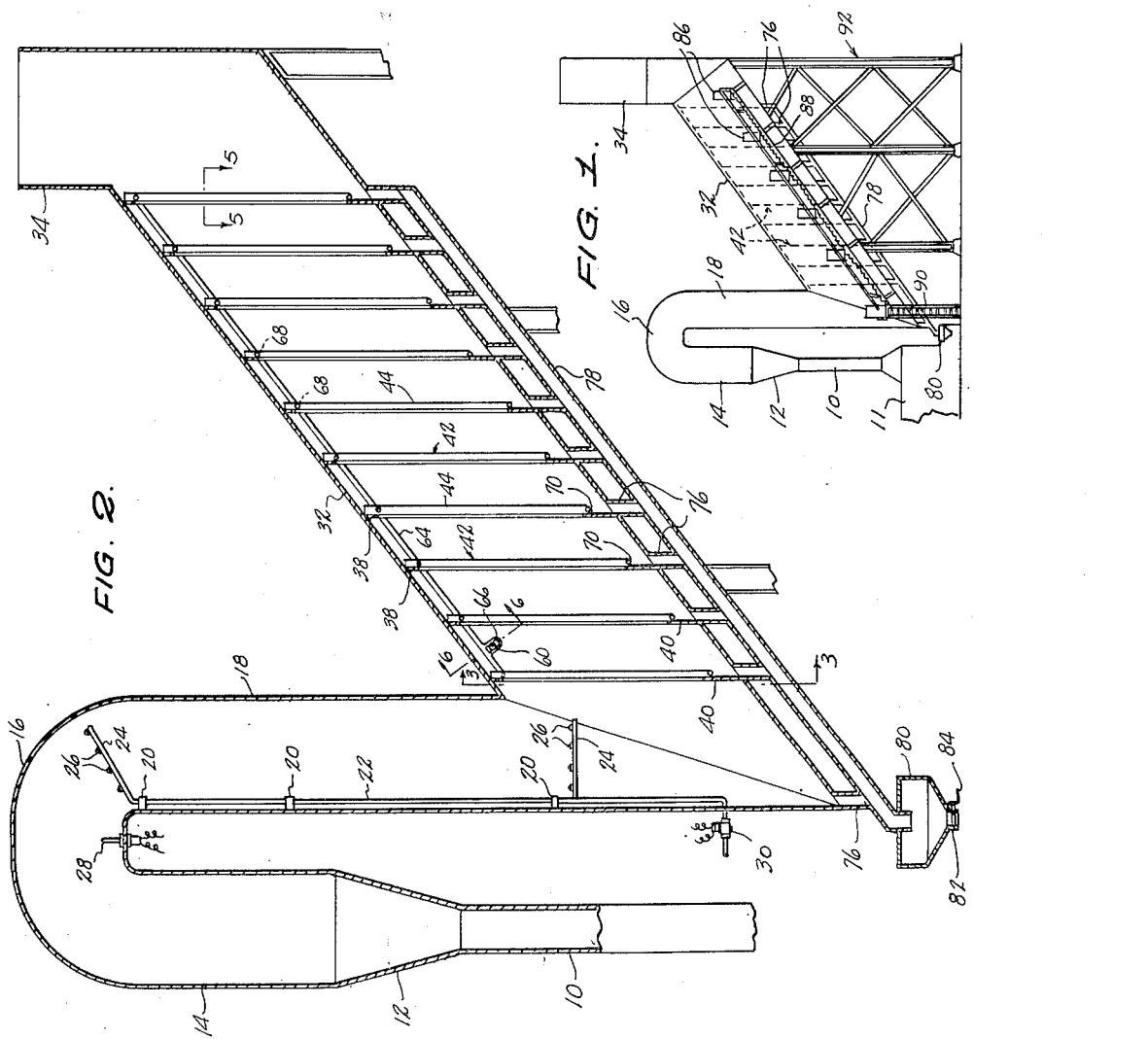

2,673,620

UNITED STATES PATENT OFFICE 2,673,620

SMOKE FILTERING APPARATUS

James Paul Montgomery, Kent, Pa.

Application October 5, 1951, Serial No. 249,854

3 Claims. (Cl. 183—58)

This invention relates to apparatus for filtering smoke, and more particularly, has reference to apparatus for the purpose stated adapted to be associated with particular effectiveness with large furnace installations from which large quantities of smoke and other dust and soot laden products of combustion are discharged.

The problem of removing dust, soot, and other foreign material from smoke is well appreciated as being a serious one, in many areas. Great strides have been made in respect to filtering or cleansing the smoke, but in many instances, the apparatus devised for this purpose is rather expensive, or is impracticable for other reasons.

In this connection, especially is it important to provide a relatively inexpensive smoke filtering apparatus when such apparatus is to be used as a part of an installation wherein exceptionally large quantities of smoke result from the production processes employed during the formulation of low cost products of various types. Obviously, under ordinary circumstances a relatively complex, expensive apparatus might be required for cleansing the large quantities of smoke issued, as a result of which the cost of manufacture of the products involved would rise to the point where the smoke cleansing or filtering means would be commercially impracticable.

It is, accordingly, the broad object of the present invention to provide smoke filtering apparatus designed particularly for incorporation in large installations wherein great quantities of smoke are produced almost continuously, it being proposed to provide apparatus as described which will be highly simplified and inexpensive despite the large size thereof.

A further important object is to provide smoke filtering apparatus as stated which can be incorporated in already existing furnace installations without modification or redesigning of said installations.

Another important object is to provide apparatus for filtering and cleansing smoke which will involve a minimum of parts so arranged as to be readily replaced or cleaned without interference with parts adjacent thereto.

A still further important object is to provide, in apparatus falling within the category referred to, a filtering screen construction wherein the screen is composed of a plurality of separably connected segmental frames, each of which is removable for replacement without interfering with segmental frames adjacent thereto, a series of these screens being arranged within a smoke filtering conduit in such a manner as to be vibrated jointly for the purpose of continuously removing therefrom particles of dust or other foreign elements retained thereby on passage of smoke through said series.

Other objects will appear from the following description, the claims appended thereto, and from the annexed drawings, in which like reference characters designate like parts throughout the several views, and wherein:

Figure 1 is a side elevational view of smoke filtering apparatus formed in accordance with the present invention;

Figure 2 is a longitudinal sectional view, on an enlarged scale, through said apparatus;

Figure 3 is a transverse sectional view, the scale being enlarged still further, taken on line 3—3 of Figure 2;

Figure 4 is a fragmentary longitudinal section taken substantially on line 4—4 of Figure 3;

Figure 5 is a sectional view, on a scale enlarged still further, taken substantially on line 5—5 of Figure 2;

Figure 6 is a fragmentary transverse sectional view through the smoke filtering conduit showing the means for vibrating the several screens; and Figure 7 is a view similar to Figure 3, though on a scale reduced somewhat below that of Figure 3, showing a modified form of conduit and screen construction.

Referring to the drawings in detail, the reference numeral 10 designates the stack of a furnace or other smoke-producing installation 11. The stack 10 extends upwardly from the furnace 11, and merges at its upper end into a flared adaptor portion, which in turn merges into a riser 14. The riser 14 is increased substantially in diameter above the diameter of the stack 10, so as to slow the velocity of the smoke moving therethrough.

The riser 14 extends upwardly into communication with a return bend portion 16, which may be formed integrally with the riser 14 as desired. The return bend portion 16 in turn is integral or otherwise rigid with a downwardly extended passage 18, which is preferably vertically arranged.

In the downwardly extended passage 18, I provide a plurality of vertically aligned brackets 20, on which is mounted a vertically disposed water supply pipe 22. The supply pipe 22, at locations spaced longitudinally thereof, is in communication with branch pipes 24, that extend laterally from the supply pipe 22 across the passage 18. Each branch 24 is equipped with a longitudinal series of water outlet ports 26.

In the return bend portion 16, temperatures tend to become very high, and for the purpose of lowering the temperature of the smoke, I provide a thermostat 28 in said portion 16. The thermostat 28 is electrically connected to a magnetically controlled valve 30 disposed in the water supply pipe 22, exteriorly of the passage 18. In a manner well known to those skilled in the art, the thermostat 28 is adapted to control operation of the magnetic valve 30 whenever temperatures in the return bend portion 16 rise to a set limit. As soon as the temperatures rise to this limit, the magnetic valve 30 opens, causing water to be discharged through the water outlet parts 26, the water gravitating within the passage 18 in a plurality of streams so as to lower considerably the temperature of the smoke passing through the passage 18, while at the same time cleansing the smoke to some extent.

At its lower end, the downwardly extended passage 18 opens into the inlet end of an upwardly inclined filtering duct or conduit 32. The conduit 32 is of a diameter enlarged substantially above that of the passage 18, so as to slow still further the rate of speed of the smoke passing therethrough. At the outlet end of the conduit 32, a discharge stack 34 is provided, through which the cleansed smoke passes to atmosphere.

In the form of the invention illustrated in Figures 1 to 6 inclusive, the conduit 32 is of circular cross sectional configuration. This may be particularly noted from Figure 3. Extended longitudinally of the generally circular conduit 32, however, is a trough 36, which may be formed integrally with the side wall of the conduit.

Spaced longitudinally of the conduit 32 is a series of annular internal ribs 38, which are extended downwardly into the trough 36 as at 40, so as to form a plurality of partitions within and spaced longitudinally of the trough. The ribs 38 are disposed vertically within the inclined duct 32, as may be particularly noted from Figure 2.

Each rib 32 has associated therewith a filtering screen 42. Considering the construction of each filtering screen 42, it will be observed from Figure 4 and also from Figure 3 that each screen includes a channeled rim 44 concentric with the duct or conduit 32, but formed to a diameter slightly less than that of the duct.

Each of the channeled rims 44 is integral or otherwise rigid with perpendicularly related frame supports 46, 48 which are integrally or rigidly joined at their point of intersection. The supports 46, 48 are not of channeled construction, but rather, are formed as flat bars.

Carried by each rim 44 are four segmental screen frames 50 of quadrantal shape. Each of these has a channeled, open frame extending peripherally thereof, in which frame is provided a screening member 52.

It will be understood that the several screening members 52 of the respective screens 42 will be of a selected mesh, and it may be that that screen member 42 disposed closest to the inlet end of the duct 32 will be of the coarsest mesh, with succeeding screens being of successively finer mesh. Or, if desired the screens may all be of the same mesh.

In any event, after the several screen frames 50 have been placed within a rim 44, they are secured rigidly but removably within said rim through the provision of a plurality of bolts 54, that extend through suitable openings formed in the ports 46, 48. The bolts 54 extend between the several screen frames, and are provided with retaining washers 56 lapping contiguous screen frame portions as to hold the screen frames assembled with one another and with the members 46, 48.

I believe it will be readily appreciated that whenever it is desired to remove a particular segmental frame, it is merely necessary that the bolts 54 engaging said frame be removed, after which the frame can be taken out of its associated rim 44 without interfering with the screen frames arranged in juxtaposition thereto. In this way, individual screen frames can be replaced whenever desired, without interference with any other portions of the apparatus.

Means is provided in the invention for imparting vibratory movement to the several screens 42, for the purpose of continuously shaking therefrom dust or other foreign elements lodging in the several screen frames upon passage of smoke through the conduit 32. To this end, I provide a pair of coaxial bearings 58 formed in the side wall of the conduit 32 (Figure 6), which bearings 58 are preferably disposed adjacent the inlet end of the duct 32, although location of said bearings at this point is not critical to successful operation of the invention. The bearings 58 receive the opposite end portions of a drive shaft 60, that extends chordally of the conduit 32, and is rotated by a suitable source of power, such as an electric motor 62 mounted upon a bracket secured fixedly to the exterior surface of the conduit 32 (Figure 3).

A reciprocable shaft 64 extends longitudinally of the conduit 32, said shaft 64 extending from end to end of the conduit, as may be readily noted by reference to Figure 2. The shaft 64 is formed, intermediate opposite ends thereof, with a rigid eye 66, through which the shaft 60 extends. The portion of the shaft 60 extending through the eye 66 has rigidly secured thereto an eccentric 67, which engages opposite sides of the eye 66. As a result, on rotation of the shaft 60, the shaft 64 will be reciprocated at high speed, and, since the shaft 64 is connected at 68 to each of the several screens 42, vibratory movement will be imparted jointly to all the screens 42.

The screens 42, in this connection, are pivotally joined at 70 to the several partitions 40 disposed within the trough 36. At a location diametrically opposite the pivotal connections 70, the screens are engageable against the flange 38, but are free of connections to the flange 38, thus to be continuously engaged with the flange 38 during vibratory movement in the manner described above.

Since the several screens 42 are so arranged as to strike repeatedly the several flanges 38, and since said flanges 38 are rigid with the conduit 32, a slight vibratory action occurs throughout the conduit 32, tending to dislodge from the side wall of said conduit any dust or foreign particles that may otherwise tend to accumulate upon the inner surface of said side wall. Further, this vibratory action is transmitted to the trough 36, to which the dust shaken from the screens 42 gravitates, causing the dust to be aided in respect to its tendency to gravitate toward the inlet end of the conduit 32.

Adjacent the outlet end of the duct 32, I prefer that the screens 42 be provided with additional filter elements, to cleanse from the smoke any foreign material which may not previously have been caught by the screens 42 through which the smoke has previously traveled. The construction of the screens disposed adjacent the outlet end of the duct 32 is shown particularly to advantage in Figure 5. As will be noted from this figure of the drawings, the screen is provided with the screen members 52 and the segmental supporting frames 50 in the same manner as the screens previously described. However, overlying the screen members 52 are other filtering screens, comprising channeled segmental frames 72 carrying filter material 74, such as rock wool, spun glass, or the like.

After the dust is shaken from the several screens 42 by the vibratory action described above, it gravitates to the trough 36, and eventually moves through depending pipes 76 communicating with the trough 36 adjacent the several partitions 40. The material filtered from the smoke then passes into a chute 78, extending longitudinally of and below the conduit 32. This chute 78 is inclined downwardly, correspondingly to the inclination of the conduit 32, and opens at its outlet end into a dust tank 80 of generally funnel shaped construction, having at its lower end a reduced opening 82 controlled by a pivot enclosure operable by a crank 84 or the like.

It will be desirable, from time to time, to clean the interior of the conduit 32, and also to replace individual screen or filter frames. To this end, I provide a plurality of access doors 86, that are spaced longitudinally of the conduit 32. Preferably, a door 86 is disposed between each pair of adjacent screens 42, so that one entering the conduit 32 through any door 86 is enabled to replace screens at opposite sides of said door.

For the purpose of permitting a workman to reach any desired door 86, I provide an inclined ladder 88, mounted upon the conduit 32 and extending longitudinally and exteriorly of said conduit. The inclined ladder 88, being elevated above the ground a substantial distance, is reached through the medium of a vertical ladder 90.

The entire apparatus is adapted to be supported upon any suitable framework such as that generally designated 92 in Figure 1, said framework in the present instance being composed of a plurality of girders and truss members.

In Figure 7, I have illustrated a modified form wherein the conduit is of square cross sectional configuration rather than the circular cross sectional shape illustrated in Figure 3. Thus, the conduit 94 corresponds to the inclined conduit 32, and is integrally formed, along its bottom wall, with a trough 96 having sloping sides that incline downwardly toward the longitudinal center line of the apparatus. The trough 96 corresponds to the trough 36 of the first form of the invention, and is integral with a longitudinally disposed chute 98 that corresponds to the chute 78 of the first form.

Spaced transversely disposed flanges 100 are provided within the conduit 94, these corresponding to the flanges 38, 40 of the first form of the invention, and each flange 100 is provided medially between opposite sides thereof with a depending tongue 102 extending partially into the chute 98.

Mounted within the conduit 94, at locations spaced longitudinally thereof, are square rims 104 of channel formation, having crossing supports 106, 108. The supports 106, 108 are adapted to engage square screen frames 110 corresponding to the segmental frames 50. It will be understood that the means employed to hold the screen frames 110 rigidly against the supports 106, 108, while still permitting removal of said screen frames, will be the same as that utilized in the first form of the invention, namely, bolts 54 and washers 56.

The form of the invention illustrated in Figure 7 may be advantageous, in some installations, so as to permit the formation of the conduit, trough, and chute from a plurality of plates of flat sheet material, welded together or otherwise rigidly connected, thus to eliminate the formation of a conduit of circular cross section and the attachment of pipes 76 and 78 to said conduit.

It will be understood that the invention can be used for filtering smoke in structures such as large apartment or office buildings as well as in industrial installations. In these instances it would of course be constructed on a smaller scale.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In smoke filtering apparatus, an inclined conduit adapted for the passage therethrough of smoke to be filtered and having its inlet end disposed below its outlet end; a trough extending along the lower portion of said conduit from its inlet end to its outlet end; a chute exteriorly of said conduit and extending in longitudinal spaced relation with respect to said trough; a plurality of ribs arranged transversely of and in spaced longitudinal relation projecting from the interior of said conduit; each of said ribs having the lower portion projecting through and secured to said trough; a pipe positioned between adjacent rib lower portions and connecting said trough to said chute; a screen bridging each rib and movably connected to the latter for filtering foreign particles from smoke passing through said conduit; and vibratory motion imparting means operatively connected to all of said screens to dislodge said particles therefrom for gravitation of the dislodged particles to said chute and discharge of the particles exteriorly of the conduit.

2. In smoke filtering apparatus, an inclined conduit adapted for the passage therethrough of smoke to be filtered and having its inlet end disposed below its outlet end; a trough extending along the lower portion of said conduit from its inlet end to its outlet end; a chute exteriorly of said conduit and extending in longitudinal spaced relation with respect to said trough and having one end adjacent the outlet of said conduit and in communication with said trough and having the other end adjacent the inlet of said conduit for the discharge of collected particles therefrom; a plurality of ribs arranged transversely of and in spaced longitudinal relation projecting from the interior of said conduit; each of said ribs having the lower portion projecting through and secured to said trough; a pipe positioned between adjacent rib lower portions and connecting said trough to said chute; a screen bridging each rib and movably connected to the latter for filtering foreign particles from smoke passing through said conduit; and vibratory motion imparting means operatively connected to all of said screens to dislodge said particles therefrom for gravitation of the dislodged particles to said chute and discharge of the particles exteriorly of the conduit.

3. In smoke filtering apparatus, an inclined conduit adapted for the passage therethrough of smoke to be filtered and having its inlet end disposed below its outlet end; a trough extending along the lower portion of said conduit from its inlet end to its outlet end; a chute exteriorly of said conduit and extending in longitudinal spaced relation with respect to said trough and having one end adjacent the outlet of said conduit and in communication with said trough and having the other end adjacent the inlet of said conduit for the discharge of collected particles therefrom; a closed tank exteriorly of said conduit adjacent the inlet end of the latter and in communication with the other end of said chute; a plurality of ribs arranged transversely of and in spaced longitudinal relation projecting from the interior of said conduit; each of said ribs having the lower portions projecting through and secured to said trough; a pipe positioned between adjacent rib lower portions and connecting said trough to said chute; a screen bridging each rib and movably connected to the latter for filtering particles from smoke passing through said conduit; and vibratory motion imparting means operatively connected to all of said screens to dislodge said particles therefrom, for gravitation of the dislodged particles to said chute and discharge of the particles exteriorly of the conduit.

JAMES PAUL MONTGOMERY.

References Cited in the file of this patent

UNITED STATES PATENTS

| Number | Name | Date |
|---|---|---|
| 1,268,304 | Warren | June 4, 1918 |
| 1,484,260 | Gibbs | Feb. 19, 1924 |
| 1,818,736 | Moore | Aug. 11, 1931 |
| 2,042,289 | Baldwin | May 26, 1936 |
| 2,189,234 | Wagner | Feb. 6, 1940 |

FOREIGN PATENTS

| Number | Country | Date |
|---|---|---|
| 521,061 | Great Britain | May 10, 1940 |
| 595,718 | France | July. 24, 1925 |